United States Patent
Dahl et al.

(10) Patent No.: US 10,589,219 B2
(45) Date of Patent: Mar. 17, 2020

(54) ENVIRONMENTAL CONTROL ASSEMBLIES

(71) Applicant: Seagate Technology LLC, Cupertino, CA (US)

(72) Inventors: Brian T. Dahl, Minnetonka, MN (US); Andrew J. Hutchinson, New Prague, MN (US)

(73) Assignee: Seagate Technology LLC, Cupertino, CA (US)

( * ) Notice: Subject to any disclaimer, the term of this patent is extended or adjusted under 35 U.S.C. 154(b) by 245 days.

(21) Appl. No.: 15/796,609

(22) Filed: Oct. 27, 2017

(65) Prior Publication Data

US 2019/0126196 A1 May 2, 2019

(51) Int. Cl.
*B01D 53/02* (2006.01)
*B01D 53/26* (2006.01)
*B01D 46/54* (2006.01)
*B01D 71/36* (2006.01)
*B01D 53/04* (2006.01)

(52) U.S. Cl.
CPC ......... *B01D 53/261* (2013.01); *B01D 46/543* (2013.01); *B01D 53/0407* (2013.01); *B01D 53/268* (2013.01); *B01D 71/36* (2013.01); *B01D 2253/102* (2013.01); *B01D 2257/80* (2013.01)

(58) Field of Classification Search
CPC .......... B01D 2253/102; B01D 2257/80; B01D 46/543; B01D 53/0407; B01D 53/261; B01D 53/268; B01D 71/36
See application file for complete search history.

(56) References Cited

U.S. PATENT DOCUMENTS

| | | | | |
|---|---|---|---|---|
| 5,997,614 A * | 12/1999 | Tuma | ............. | B01D 46/10 360/99.19 |
| 6,143,058 A * | 11/2000 | Dahlgren | ............. | C02F 3/302 55/385.1 |
| 6,296,691 B1 * | 10/2001 | Gidumal | ............. | B01D 46/0032 360/99.16 |
| 6,395,073 B1 * | 5/2002 | Dauber | ............. | B01D 39/1692 360/99.17 |
| 6,475,269 B1 * | 11/2002 | Turner | ............. | G11B 33/146 360/99.2 |
| 6,936,093 B2 * | 8/2005 | Isogawa | ............. | B01D 46/0032 55/385.6 |
| 7,318,859 B2 * | 1/2008 | Ball | ............. | B01D 46/0036 360/97.16 |
| 7,591,868 B2 * | 9/2009 | Johnson | ............. | B01D 53/0415 360/97.16 |
| 8,033,304 B2 * | 10/2011 | Tuma | ............. | B01D 46/0001 141/8 |
| 8,254,055 B2 * | 8/2012 | Brown | ............. | G11B 33/1453 264/319 |
| 8,861,127 B2 * | 10/2014 | Brown | ............. | H05K 5/0213 360/97.16 |
| 10,010,822 B2 * | 7/2018 | Miller, III | ............. | B01D 46/2403 |

(Continued)

*Primary Examiner* — Christopher P Jones
(74) *Attorney, Agent, or Firm* — Faegre Drinker Biddle & Reath

(57) ABSTRACT

An environmental control assembly includes a housing including a base layer, a diffusor layer, and an interior space at least partially formed by the base layer and the diffusor layer. The environmental control assembly further includes a desiccant positioned within the interior space and an inlet filter that is formed from a cutout in the base layer that is covered by the diffusor layer.

19 Claims, 6 Drawing Sheets

(56) References Cited

U.S. PATENT DOCUMENTS

| | | | | |
|---|---|---|---|---|
| 2002/0063990 | A1* | 5/2002 | Hirasaka | G11B 33/1486 360/97.18 |
| 2002/0075590 | A1* | 6/2002 | Garikipati | G11B 5/6005 360/97.17 |
| 2004/0013866 | A1* | 1/2004 | Sasaki | B01D 53/02 428/304.4 |
| 2004/0168575 | A1* | 9/2004 | Isogawa | B01D 46/0032 96/134 |
| 2005/0139077 | A1* | 6/2005 | Garikipati | B01D 53/0415 96/130 |
| 2005/0139078 | A1* | 6/2005 | Tuma | B01D 53/0415 96/134 |
| 2005/0241483 | A1* | 11/2005 | Okada | B01D 53/02 96/134 |
| 2008/0226534 | A1* | 9/2008 | Gidumal | G11B 33/1453 423/416 |
| 2009/0090245 | A1* | 4/2009 | Olszewski | B01D 46/0005 96/154 |
| 2010/0206629 | A1* | 8/2010 | Natarajan | B01D 53/261 174/546 |
| 2011/0277638 | A1* | 11/2011 | Li | B01D 39/1692 96/139 |
| 2013/0044391 | A1* | 2/2013 | Brown | G11B 25/043 360/97.16 |
| 2013/0044392 | A1* | 2/2013 | Brown | G11B 25/043 360/97.16 |
| 2013/0114163 | A1* | 5/2013 | Brown | B01D 53/0407 360/97.22 |
| 2014/0043711 | A1* | 2/2014 | Miller, III | G11B 33/146 360/97.16 |
| 2017/0178695 | A1* | 6/2017 | Miller, III | G11B 33/146 |
| 2017/0333820 | A1* | 11/2017 | Tuma | G11B 33/1446 |
| 2017/0347473 | A1* | 11/2017 | Freer | H05K 5/0213 |

* cited by examiner

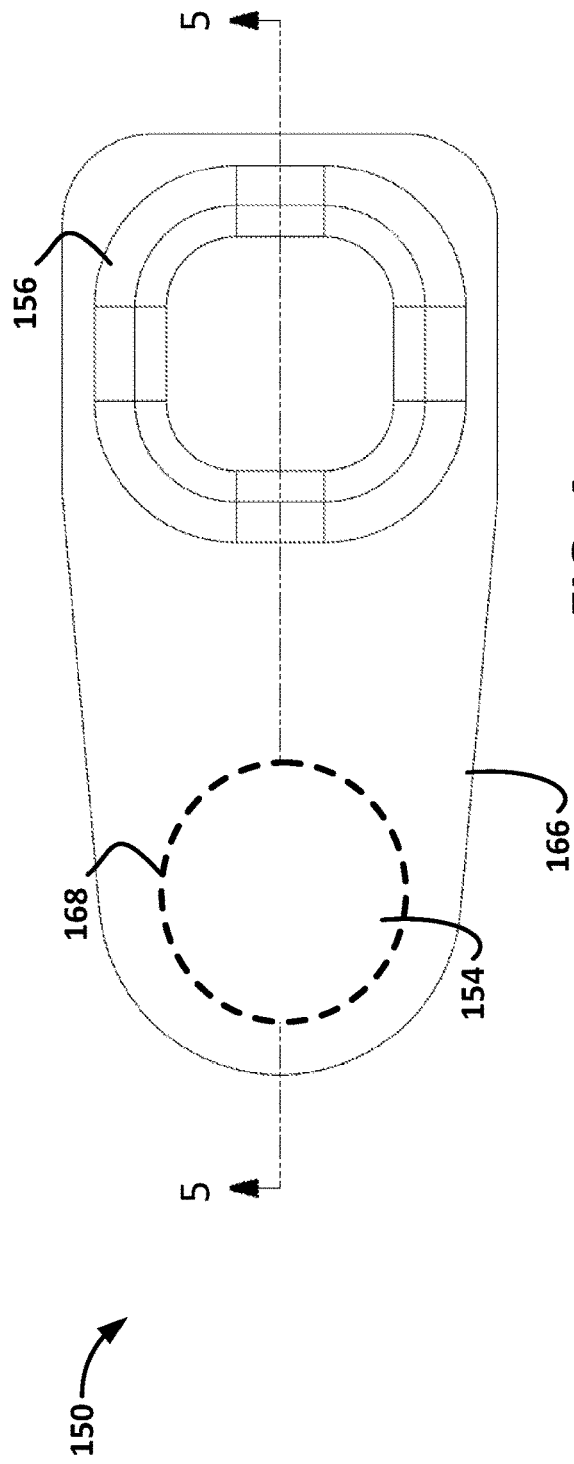
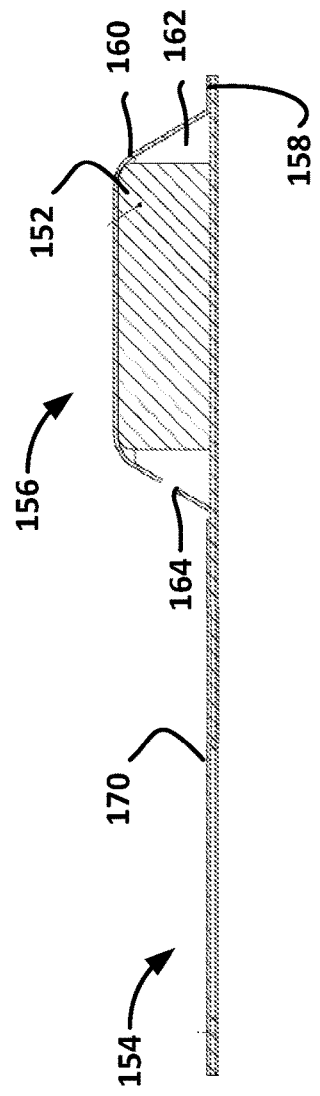

ENVIRONMENTAL CONTROL ASSEMBLIES

SUMMARY

In certain embodiments, an environmental control assembly includes a housing including a base layer, a diffusor layer, and an interior space at least partially formed by the base layer and the diffusor layer. The environmental control assembly further includes a desiccant positioned within the interior space and an inlet filter that is formed from a cutout in the base layer that is covered by the diffusor layer.

In certain embodiments, a hard drive includes a base deck, a process cover coupled to the base deck to form an enclosure that houses one or more hard drive components within an internal environment, and an environmental control assembly coupled to the process cover. The process cover includes an aperture. The environmental control assembly includes an inlet filter and a housing with a desiccant positioned within the housing. The inlet filter is positioned adjacent to the aperture of the process cover.

In certain embodiments, an environmental control assembly includes a substantially flat base layer with a cutout portion. The environmental control assembly further includes a diffusor layer formed over at least a portion of the base layer and covering the cutout. The base layer and the diffusor layer form a housing with an interior space within which a desiccant is positioned.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 4 shows a top view of an environmental control assembly, in accordance with certain embodiments of the present disclosure.

FIG. 5 shows a cross-section view of the environmental control assembly of FIG. 4, in accordance with certain embodiments of the present disclosure.

Figure 1:
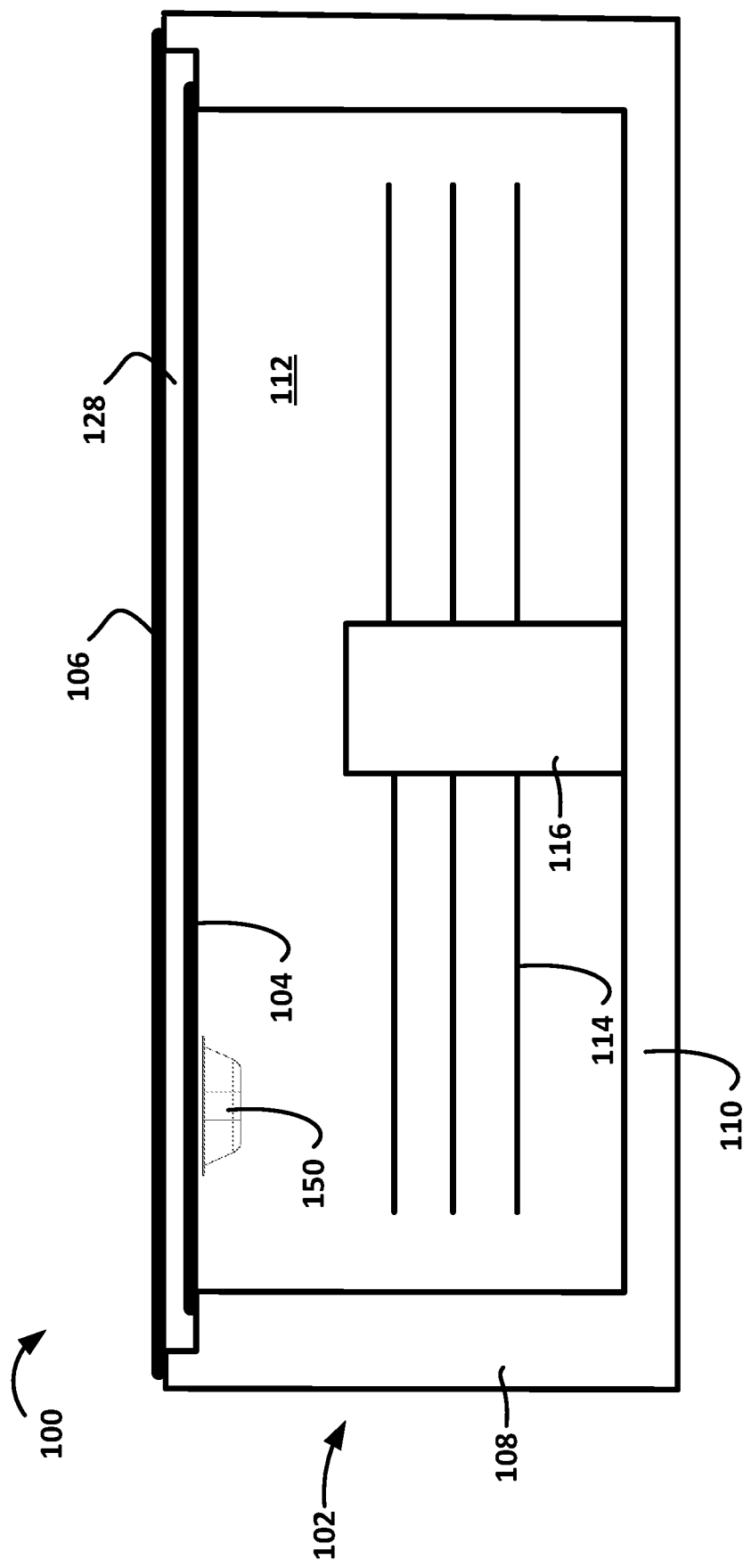
FIG. 1 shows a cut-away side view of a hard drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to systems, methods, and devices utilizing an environmental control assembly. Environmental control assemblies can be used to help control environmental conditions (e.g., humidity, particles) within electronic devices such as hard drives. Humidity (e.g., relative humidity) within hard drives affects interfaces between heads and disks. For example, head-to-disk stiction and media corrosion are more likely to occur at high relative humidity levels, and excessive disk wear and electrostatic discharge are more likely to occur at very low relative humidity levels. As another example, various hard drive components are sensitive to certain particulates and contaminants, which may shorten the life span of the components via corrosion, wear, etc. Accordingly, certain embodiments of the present disclosure are directed to environmental control assemblies that help control humidity within an environment and filter particulates and contaminants.

Figure 2:
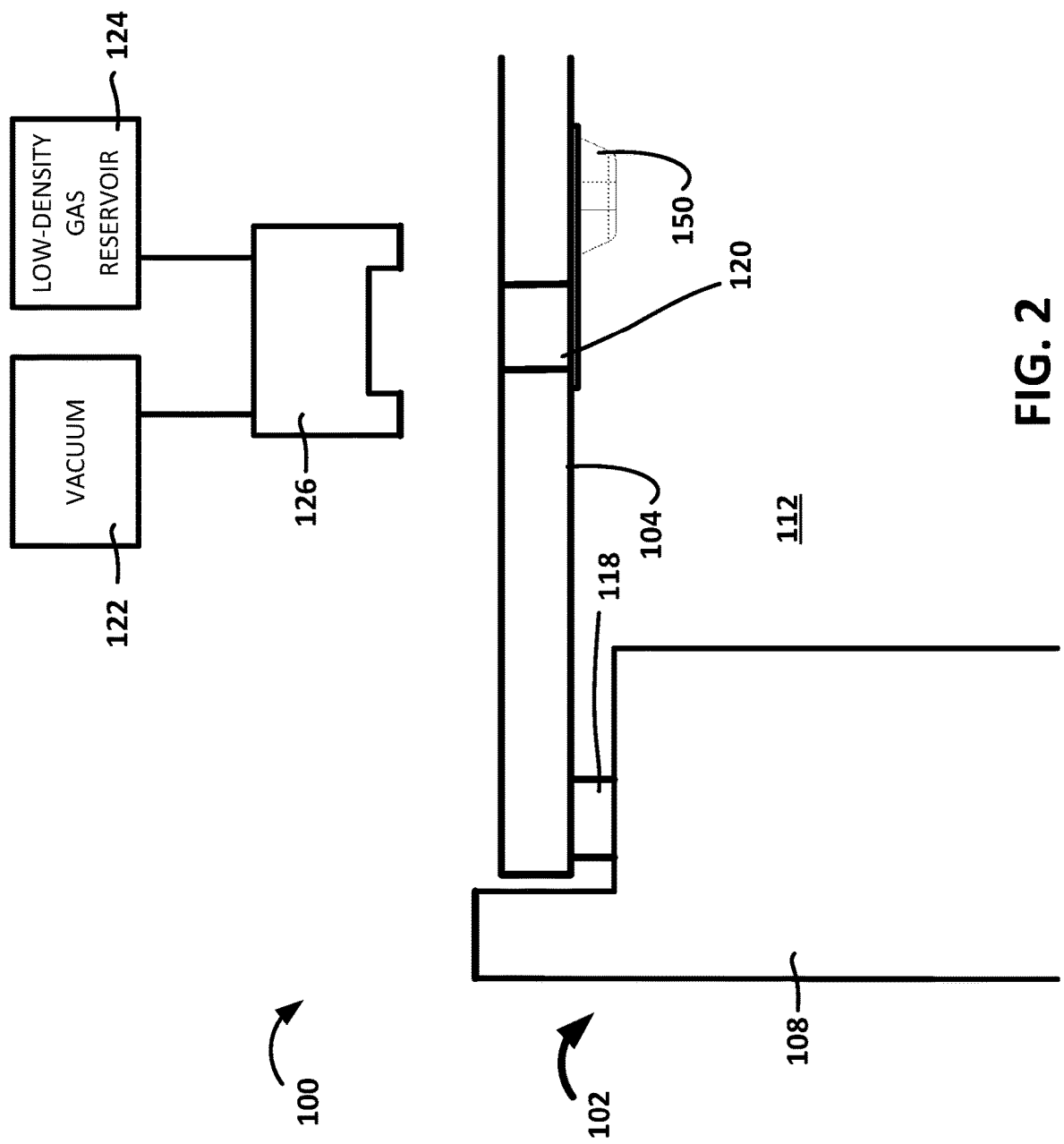
FIG. 2 shows a cut-away side view of an upper portion of the hard drive of FIG. 1, in accordance with certain embodiments of the present disclosure.
Figure 3:
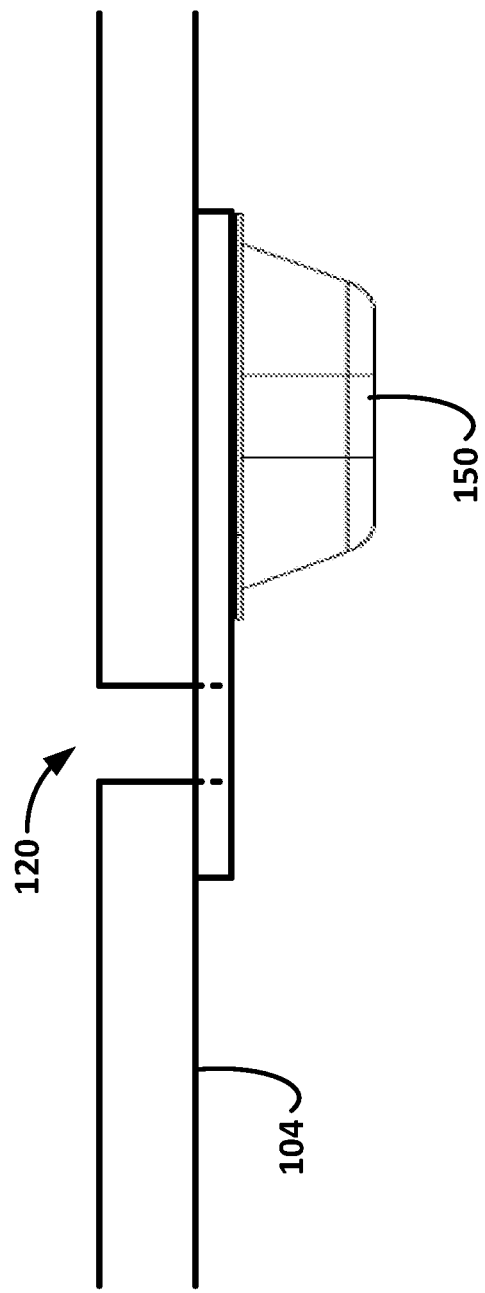
FIG. 3 shows a partial, cross-section view of the hard drive of FIG. 1, in accordance with certain embodiments of the present disclosure.

FIG. 1 shows a cut away side view of a hard drive 100 including a base deck 102, a process cover 104, and a final cover 106. FIGS. 2 and 3 show a cut away side view of an upper portion of the hard drive 100. The base deck 102 includes side walls (e.g., side wall 108) that, together with a bottom portion 110 of the base deck 102 and the process cover 104, creates an internal cavity 112 that may house data storage components like magnetic recording media 114, a spindle motor 116, etc.

During assembly, the process cover 104 can be coupled to the base deck 102 by removable fasteners (not shown) and a gasket 118 (shown in FIG. 2) to seal a target gas (e.g., air and/or a lower-density gas like helium) within the internal cavity 112. Once the process cover 104 is coupled to the base deck 102, a target gas may be injected into the internal cavity 112 through an aperture 120 (see FIGS. 2-3) in the process cover 104, which is subsequently sealed. Injecting the target gas, such as a combination of air and a low-density gas like helium, may involve first evacuating existing gas from the internal cavity 112 using a vacuum 122 and then injecting the target gas from a low-density gas supply reservoir 124 into the internal cavity 112. For example, to facilitate the filling of the internal cavity 112, a sealing assembly 126 (shown in FIG. 2) may be used. The sealing assembly 126 is shown as being coupled to the vacuum 122 and the low-density gas reservoir 124. In use, the sealing assembly 126 may utilize the vacuum 122 to evacuate the existing gas from the internal cavity 112 and then utilize the low-density gas reservoir 124 to inject a target gas into the internal cavity 112. For example, the sealing assembly 126 is moved towards the aperture 120 in the process cover 104 and be temporarily coupled to the process cover 104. Once coupled, the sealing assembly 126 may evacuate the existing gas from the internal cavity 112 via the aperture 120 and then inject the target gas into the internal cavity 112 via the aperture 120. The sealing assembly 126 (or another device) can then seal or close the aperture 120 (by applying a seal, welding, or the like) to keep the target gas within the hard drive 100 and, in particular, the internal cavity 112. Then, the base deck 102 and the final cover 106 can be coupled together to create an internal cavity between the process cover 104 and the final cover 106. The base deck 102 and the final cover 106 may be coupled together, for example, by welding and the like. Once the final cover 106 is coupled to the base deck 102, a target gas may similarly be injected through an aperture in the final cover 106 to fill the internal cavity 128 between the process cover 104 and the final cover 106.

As shown in FIGS. 1-3, an environmental control assembly 150 can be positioned within the internal cavity 112 and coupled to the process cover 104. FIGS. 2-3 show a portion of the environmental control assembly 150 covering the aperture 120 in the process cover 104. FIGS. 4-8 show various views and features of the environmental control assembly 150, which is discussed in further detail below.

The environmental control assembly 150 is used help control environmental conditions within the internal cavity 112 of the hard drive 100. In certain embodiments, the environmental control assembly 150 is configured to regulate relative humidity within the internal cavity 112 and/or keep particles and/or contaminants from entering the internal cavity 112. The environmental control assembly 150 includes a desiccant 152 (see FIG. 5) to help regulate relative humidity and includes an inlet filter 154 (see FIGS. 4-8) to help keep particles and/or contaminants from entering the internal cavity 112.

In certain embodiments, the desiccant 152 includes material that absorbs and releases water vapor according to a level of relative humidity in the internal cavity 112 relative to a level of moisture of the material. For example, relative humidity may be maintained within a target range by the desiccant 152 absorbing additional water vapor when the relative humidity in the internal cavity 112 exceeds the target range, and the desiccant 152 releasing water vapor when the relative humidity in the internal cavity 112 falls below the target range. Before sealing the process cover 104, the desiccant's material can be charged to a specific moisture level such that the environmental control assembly 150 is set to maintain relative humidity within the internal cavity 112 to a target relative humidity range.

In certain embodiments, the desiccant 152 comprises a material that is charged with a level of moisture sufficient to maintain a desired relative humidity in an enclosure over a period (e.g., a number of years) during which moisture may escape from or enter into the hard drive 100. As one example, the lifespan of components in a hard drive may be extended by maintaining relative humidity within the hard drive within a range of 5% to 15%. In certain embodiments, the desiccant's material is configured to have a moisture level sufficient to maintain a desired relative humidity in an enclosure of 5% to 15% over time.

The desiccant may include various materials to absorb and/or release water vapor or various other elements (e.g., volatile organic vapor contaminates). Such materials for absorption may include silica gel, activated carbons, chemical getters, chemical acid buffers, bicarbonates and polymers such as polyacrylic acid or polyacrylamide, and various combinations thereof. In certain embodiments, the desiccant 152 does not include silica gel or contains substantially no silica gel, as silica gel may lead to a relative humidity that undesirably rises over time. Alternatively or additionally, the desiccant 152 may include materials configured to regulate various other contaminants. For example, in certain embodiments, the material traps oxygen from the internal cavity 112 to reduce the risk of oxidation.

As shown in FIG. 5, the desiccant 152 is positioned within the environmental control assembly 150. In particular, the desiccant 152 is positioned within a housing 156 that includes a base layer 158 and a diffusor layer 160. It should be noted that each layer could comprise multiple materials and such materials may be layered upon each other. An interior space 162 is formed at least in part by the base layer 158 and the diffusor layer 160, and the desiccant 152 is positioned within the interior space 162. The environmental control assembly 150 may include other components such as netting to maintain the desiccant's position within the interior space 162. The netting may comprise polyester, polytetrafluoroethylene, polypropylene, polyethylene, and the like or some combination of such materials.

The base layer 158 can include an adhesive (e.g., adhesive layer 164) and/or a polymer (e.g., polymer layer 166). The adhesive layer 164 and the polymer layer 166 are both shown in FIG. 6. The adhesive layer 164 can be used to couple to the process cover 104 such that the environmental control assembly 150 is coupled to the process cover 104. In certain embodiments, the base layer 158 includes a removable release liner that covers the adhesive layer 164 until the environmental control assembly 150 is ready to be coupled to the process cover 104. For example, the release liner can cover the adhesive layer 164 so that the environmental control assembly 150 is easier to handle before installation on the process cover 104. Before installation, the release liner can be peeled from the adhesive layer 164 so that the adhesive layer 164 can stick to the process cover 104. The polymer layer 166 can help provide structure (e.g., rigidity) to the environmental control assembly 150.

The diffusor layer 160 comprises a membrane, which can include materials such as Teflon. In certain embodiments, the diffusor layer 160 forms an upper portion the environmental control assembly 150 and can extend across an entire area of the environmental control assembly 150 such that the diffusor layer 160 forms part of the housing 156 and the inlet filter 154 (discussed in more detail below). For the housing 156, as shown in FIG. 5, the diffusor layer 160 and the base layer 158 help to maintain the position of the desiccant 152 in the interior space 162. Further, the diffusor layer 160 is configured to allow moisture to transfer to and from the desiccant 152. In certain embodiments, the diffusor layer 152 is water-permeable and permits moisture to transfer through the material of the diffusor layer 160. In certain embodiments, as shown in FIG. 5, the diffusor layer 160 or some other portion of the housing 156 includes an opening 164 (e.g., a channel such as a diffusion channel) for moisture and/or regulated elements to enter and exit the interior space 162. For example, the opening 164 may allow water vapor released from the desiccant 152 to transfer to the internal cavity 112 and thereby provide and maintain a desired relative humidity in the internal cavity 112. Conversely, the opening 164 may allow excess water vapor in the internal cavity 112 to be absorbed by the desiccant 152. In certain embodiments, the opening 164 is a diffusion channel with a selected area and length such that the area-to-length ratio is 0.00025 inches or less. In certain embodiments, an outlet of the opening 164 is covered by a desiccant material. In certain embodiments, a flow rate through the opening 164 is 2.0 CC of water to 15.0 CC at 1 inch of water pressure.

Figure 6:
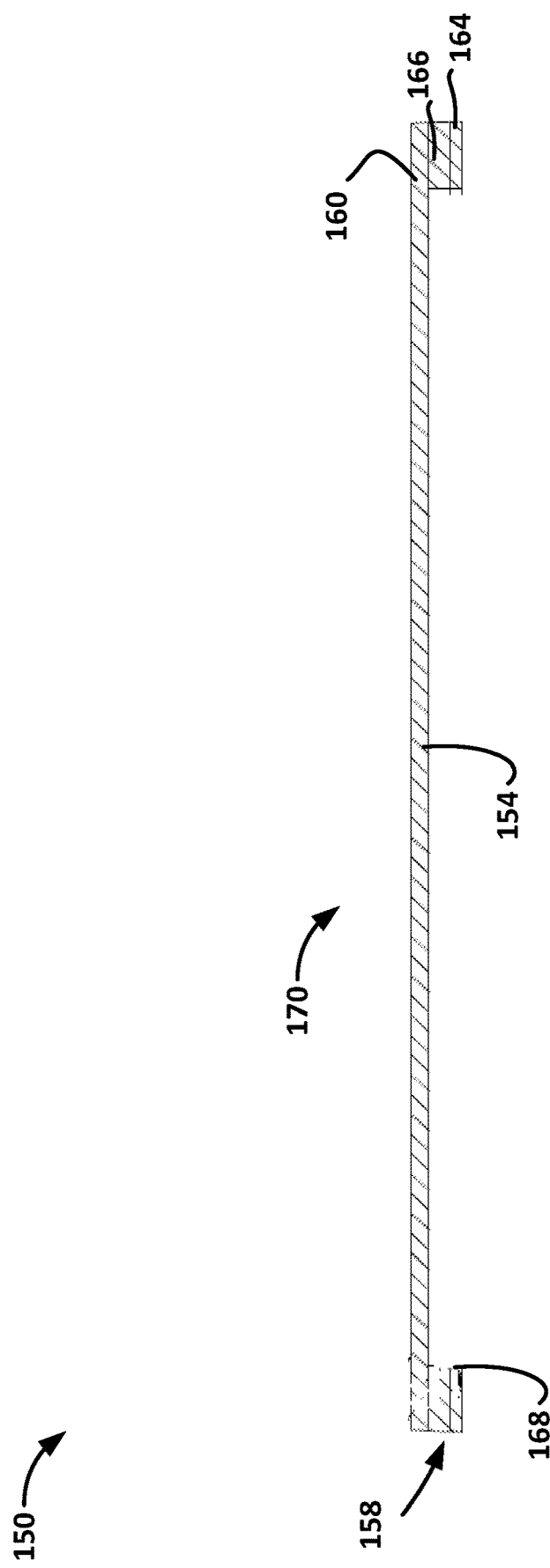
FIG. 6 shows a partial, cross-section view of the environmental control assembly of FIG. 5, in accordance with certain embodiments of the present disclosure.

As shown in FIGS. 5 and 6, the diffusor layer 160 is directly coupled to the base layer 158 at portions along the environmental control assembly 150. For example, the diffusor layer 160 is in direct contact with the base layer along the entire outer periphery 166 of the environmental control assembly 150, but, at the housing 156, the diffusor layer 160 separates from the base layer 158 such that the diffusor layer 160 and the base layer 158 form the internal space 162 where the desiccant 152 is positioned. As shown in FIG. 5, the base layer 158 and the diffusor layer 160 extend in a substantially parallel direction with respect to each other until the diffusor layer 160 extends away from the base layer 158 at the housing 156.

Figure 8:
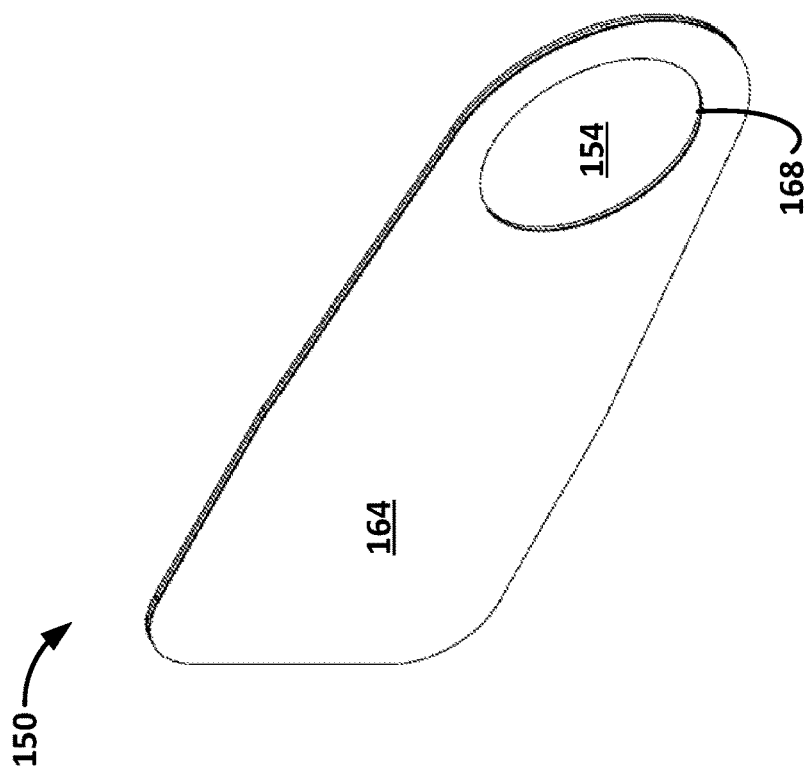
FIG. 8 shows an isometric, bottom view of the environmental control assembly of FIG. 4, in accordance with certain embodiments of the present disclosure.
Figure 7:
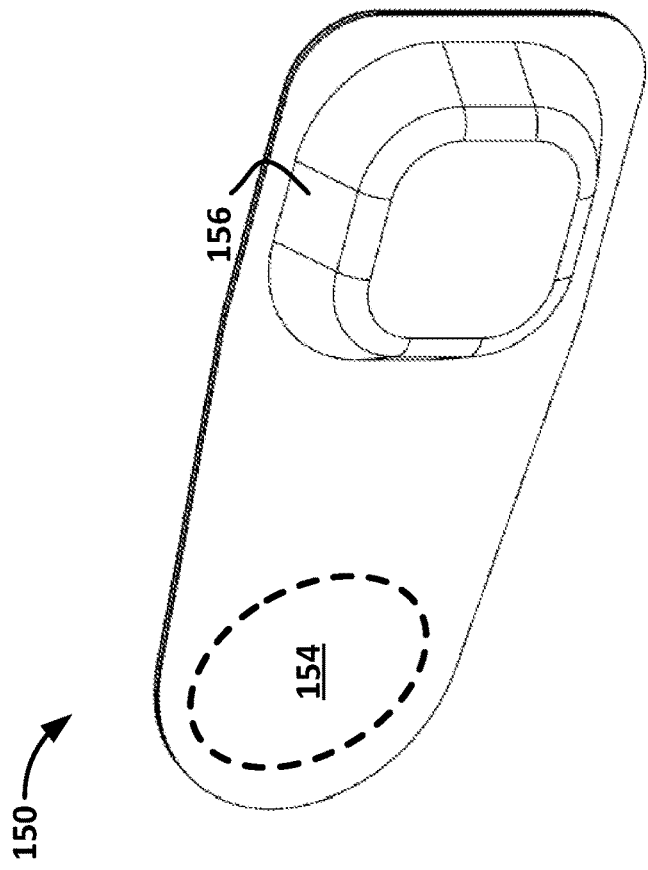
FIG. 7 shows an isometric, top view of the environmental control assembly of FIG. 4, in accordance with certain embodiments of the present disclosure.

As previously noted, the environmental control assembly 150 includes the inlet filter 154. The inlet filter 154 is comprised of a portion of the diffusor layer 160. As best seen in FIG. 8, the inlet filter 154 is formed by the diffusor layer 160 covering a cutout portion 168 formed by the base layer 158. FIG. 8 shows the cutout portion 168 as circular shaped, but other shapes are within the scope of the present disclosure. Further, the cutout portion 168 may comprise a plurality of cutouts (e.g., multiple circular-shaped cutouts). As noted above, once installed, the environmental control assembly 150 is positioned adjacent to and covers the aperture 120 in the process cover 104. The particular portion of the environmental control assembly 150 that covers the aperture 120 is the inlet filter 154. As such, the environmental control assembly 150 is installed so that the inlet filter 154 is positioned adjacent to the aperture 120. In certain embodiments, the housing 156 is not positioned adjacent to the aperture 120 in the process cover 104.

As mentioned above, during manufacture of certain hard drives, various gases (e.g., air, helium) are injected into and evacuated from the internal cavity 112. The inlet filter 154, which covers the aperture 120 in the process cover 104 through which the gases pass through, helps keeps particles and contaminants from entering the internal cavity 112. Because the diffusor layer 160 is permeable, the gases are able to be injected into and evacuated out through the aperture 120 and through the inlet filter 154 (and through the diffusor layer 160) while particles and contaminants are filtered by the inlet filter 154.

As shown in the figures and described above, the environmental control assembly 150 includes a multi-layer structure that, at one end, forms the housing 156 that covers the desiccant 152, which includes material that absorbs and releases water vapor. At its other end, the environmental control assembly 150 includes a substantially flat portion 170 (see FIG. 5) including the inlet filter 154 that helps keep particles and contaminants from entering the internal cavity 112 of the hard drive 100. The environmental control assembly 150 includes the base layer 158, which includes an adhesive layer 164 and a polymer layer 166. The base layer 158 is substantially flat and includes the cutout portion 168, which is covered by the diffusor layer 160 to form the inlet filter 154. A portion of the diffusor layer 160 is directly coupled to the base layer 158. At the housing 156, the diffusor layer 160 is not directly coupled to the base layer but instead forms a raised portion of the environmental control assembly 150 where the desiccant 152 is positioned.

In certain embodiments, a method includes attaching the environmental control assembly 150 to the process cover 104 via the adhesive layer 164. The environmental control assembly 150 is positioned, with respect to the aperture 120, such that the inlet filter 154 covers the aperture 120. The method further includes coupling the process cover 104 to the base deck 102. Then, the existing gas is evacuated from the internal cavity through the inlet filter 154 and the aperture 120. The target gas, such as air and a low-density gas like helium, is then injected in the internal cavity 112 through the aperture 120 and the inlet filter 154. The aperture 120 is then sealed via a seal or weld. Next, the final cover 106 is coupled to the base deck 102, and then existing gas is evacuated from the internal cavity 128 and target gas is injected into the internal cavity 128 between the process cover 104 and the final cover 106 via an aperture in the final cover 106. The aperture in the final cover 106 is then sealed.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. An environmental control assembly comprising:
   a housing including a base layer, a diffusor layer, and an interior space at least partially formed by the base layer and the diffusor layer;
   a desiccant positioned within the interior space; and
   an inlet filter that is formed from a cutout in the base layer that is covered by the diffusor layer without the desiccant positioned therebetween the diffusor layer and the cutout.

2. The environmental control assembly of claim 1, wherein the base layer comprises an adhesive.

3. The environmental control assembly of claim 2, wherein the base layer further comprises a polymer layer.

4. The environmental control assembly of claim 1, wherein the diffusor layer comprises a permeable membrane.

5. The environmental control assembly of claim 1, wherein the diffusor layer comprises a Teflon membrane.

6. The environmental control assembly of claim 1, wherein the desiccant comprises carbon.

7. The environmental control assembly of claim 1, wherein the desiccant does not include a silica gel.

8. The environmental control assembly of claim 1, wherein the diffusor layer includes a substantially flat portion and a raised portion.

9. The environmental control assembly of claim 1, wherein the base layer and the diffusor layer form the entire interior space.

10. The environmental control assembly of claim 1, further comprising a channel in the housing to facilitate moisture into and out of the internal space.

11. The environmental control assembly of claim 10, wherein the channel has an area-to-length ratio of 0.00025 inches or less.

12. The environmental control assembly of claim 1, wherein the desiccant is charged to a predetermined moisture level.

13. The environmental control assembly of claim 1, further comprising netting in the internal space.

14. A hard drive, comprising:
    a base deck;
    a process cover coupled to the base deck to form an enclosure that houses one or more hard drive components within an internal environment, the process cover including an aperture; and
    an environmental control assembly coupled to the process cover and including an inlet filter and a single housing with a desiccant positioned within the housing, wherein the inlet filter is positioned adjacent to the aperture of the process cover and wherein the single housing is not positioned adjacent the aperture and is the only housing of the environmental control assembly.

15. The hard drive of claim 14, further comprising a top cover coupled to the base deck.

16. The hard drive of claim 14, wherein environmental control assembly includes a base layer with a cutout covered by a diffusor layer to form the inlet filter.

17. The hard drive of claim 16, wherein the base layer includes an adhesive that couples the environmental control assembly to the process cover.

18. An environmental control assembly comprising:
- a substantially flat base layer including a cutout portion; and
- a diffusor layer formed over at least a portion of the base layer and covering the cutout, the base layer and the diffusor layer form a housing with an interior space within which a desiccant is positioned, wherein the diffusor covers the cutout without a desiccant positioned therebetween.

19. The environmental control assembly of claim 18, wherein the diffusor layer comprises a permeable membrane, and wherein the desiccant comprises carbon but not a silica gel.

* * * * *